United States Patent Office 3,772,323
Patented Nov. 13, 1973

3,772,323
2-BENZIMIDAZOL(2)-BENZOFURANS AS
OPTICAL BRIGHTENERS
Hans Schläpfer, Basel, and Guglielmo Kabas, Binningen,
Basel-Land, Switzerland, assignors to Ciba-Geigy Corporation, Ardsley, N.Y.
No Drawing. Filed June 12, 1970, Ser. No. 45,922
Int. Cl. C07d 49/38
U.S. Cl. 260—309.2                6 Claims

ABSTRACT OF THE DISCLOSURE 2-benzimidazols(2)-benzofurans useful as optical brighteners have the structure

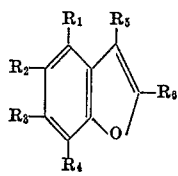

(I)

wherein $R_1$ represents hydrogen or together with $R_2$ and the 2 carbon atoms to which $R_1$ and $R_2$ are attached, it represents benzene,
$R_2$ represents hydrogen, halogen, or together with $R_1$ and the 2 carbon atoms to which $R_1$ and $R_2$ are attached, it represents benzene,
$R_3$ represents hydrogen, alkyl comprising 1 to 4 carbon atoms, or alkoxy comprising 1 to 4 carbon atoms,
$R_4$ represents hydrogen or halogen,
$R_5$ represents hydrogen or alkyl comprising 1 to 4 carbon atoms, or phenyl,
$R_6$ stands for the following:

(a)

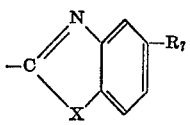

wherein
X represents NR—, wherein R stands for hydrogen, alkyl comprising 1 to 4 carbon atoms, hydroxyalkyl comprising 1 to 4 carbon atoms, phenyl or benzyl or cyclohexyl, and
$R_7$ represents hydrogen, alkyl comprising 1 to 4 carbon atoms, alkoxy comprising 1 to 4 carbon atoms or halogen.

DESCRIPTION OF THE INVENTION

The present invention relates to new benzofuran compounds, to their use for the optical brightening of organic materials and the compositions thereof.

It has been found that compounds of the following Formula I are able to optically brighten organic materials.

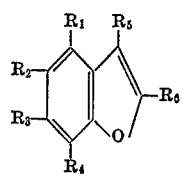

(I)

In the above formula, $R_1$ represents hydrogen, a lower alkyl group, or together with $R_2$ and the 2 carbon atoms to which $R_1$ and $R_2$ are attached it represents a benzene radical,
$R_2$ represents hydrogen, a lower alkyl group or alkoxy group, halogen, a carboxy, a carbalkoxy, an aminocarbonyl, a mono- or dialkylaminocarbonyl, a sulphonic acid, an alkylsulphonyl, an alkyloxysulphonyl, an aminosulphonyl or a mono- or dialkylaminosulphonyl group or together with $R_1$ and the 2 carbon atoms to which $R_1$ and $R_2$ are attached, it represents a benzene radical,
$R_3$ represents hydrogen or a lower alkyl group or alkoxy group or together with $R_4$ and the 2 carbon atoms to which $R_3$ and $R_4$ are attached, it represents a benzene radical,
$R_4$ represents hydrogen, a lower alkyl group or halogen, or together with $R_3$ and the 2 carbon atoms to which $R_3$ and $R_4$ are attached, it represents a benzene radical,
$R_5$ represents hydrogen, a lower alkyl group, or the phenyl group, and
$R_6$ stands for one of the following groups:

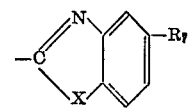

wherein
X represents oxygen or an NR— group, wherein R stands for hydrogen, a lower alkyl group or hydroxyalkyl group, having at least 2 carbon atoms, a phenyl group optionally substituted by halogen, lower alkyl group or alkoxy group; an araliphatic group, a cyclopentyl group optionally substituted, or a cyclohexyl group optionally substituted, and
$R_7$ represents hydrogen, a lower alkyl group or alkoxy group, the phenyl group, or halogen;

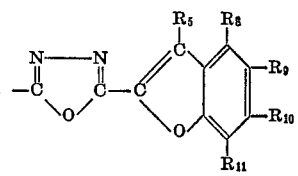

wherein $R_8$ and $R_9$ represent hydrogen, or together and with the 2 carbon atoms to which they are attached they represent a benzene radical,
$R_{10}$ represents hydrogen, a lower alkyl group, alkoxy group, or together with $R_{11}$ and with the 2 carbon atoms to which $R_{10}$ and $R_{11}$ are attached it represents a benzene radical, and
$R_{11}$ represents hydrogen, or together with $R_{10}$ and with the 2 carbon atoms to which $R_{10}$ and $R_{11}$ are attached, it represents a benzene radical;

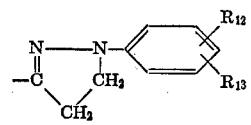

wherein $R_{12}$ and $R_{13}$ represent hydrogen, fluorine, chlorine, or a carboxy, a carbalkoxy, an aminocarbonyl, a mono- or dialkylaminocarbonyl, a sulphonic acid, an alkylsulphonyl, an alkyloxysulphonyl, an aminosulphonyl, a mono- or dialkylaminosulphonyl group.

In some cases the new compounds have an optical brightening action many times greater than that of already known benzofuran compounds, and particularly outstanding in this respect are the benzofurans of Formula I wherein $R_6$ denotes the groups

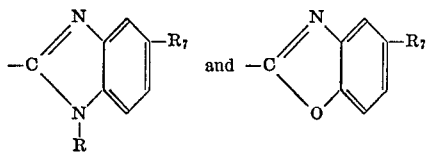

Particularly good effects are shown by the benzofurans of Formula I, wherein $R_1$ represents hydrogen or together with $R_2$ and the 2 carbon atoms to which $R_1$ and $R_2$ are attached, it represents a benzene radical, $R_2$ represents hydrogen, halogen, or together with $R_1$ and the 2 carbon atoms to which $R_1$ and $R_2$ are attached, it represents a benzene radical, $R_3$ represents hydrogen, an alkyl group comprising 1 to 4 carbon atoms, or an alkoxy group comprising 1 to 4 carbon atoms, $R_4$ represents hydrogen or halogen, $R_5$ represents hydrogen or an alkyl group comprising 1 to 4 carbon atoms, or the phenyl group, $R_6$ stands for one of the following groups:

(a)

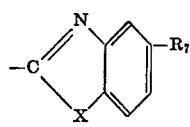

wherein,

X represents oxygen or an NR— group, wherein R stands for hydrogen, an alkyl group comprising 1 to 4 carbon atoms, a hydroxyalkyl group comprising 1 to 4 carbon atoms, the phenyl radical, or the benzyl radical or the cyclohexyl radical, and $R_7$ represents hydrogen, an alkyl group comprising 1 to 4 carbon atoms, an alkoxy group comprising 1 to 4 carbon atoms, or halogen;

(b)

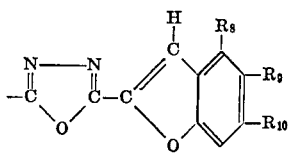

wherein $R_8$ and $R_9$ represents hydrogen, or together and with the 2 carbon atoms to which $R_8$ and $R_9$ are attached, they represent a benzene radical, and $R_{10}$ represents hydrogen, an alkyl group comprising 1 to 4 carbon atoms, or an alkoxy group comprising 1 to 4 carbon atoms, and (c)

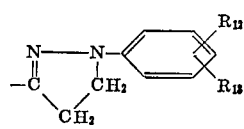

wherein $R_{12}$ and $R_{13}$ represent hydrogen or chlorine.

Most preferred are compounds of Formula I wherein $R_1$ is hydrogen or together with $R_2$ and the 2 carbon atoms to which $R_1$ and $R_2$ are attached, it represents a benzene radical, $R_2$ represents hydrogen, chlorine or together with $R_2$ and the 2 carbon atoms to which $R_1$ and $R_2$ are attached, it represents a benzene radical, $R_3$ represents hydrogen or methoxy, $R_4$ represents hydrogen or chlorine, $R_5$ represents hydrogen, methyl or phenyl, and $R_6$ represents the following groups:

(a)

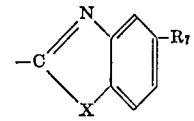

wherein,

X represents oxygen or an NR— group, wherein R stands for hydrogen, methyl, cyclohexyl, phenyl or benzyl, and $R_7$ represents hydrogen, chlorine or methyl (b)

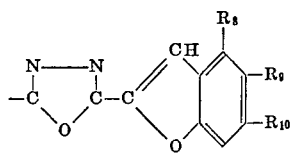

wherein $R_8$ and $R_9$ represent hydrogen or together and with the 2 carbon atoms to which they are attached the benzene radical, and $R_{10}$ represents hydrogen or methoxy, (c)

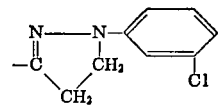

If in the compounds of Formula I, $R_2$, $R_4$ and $R_7$ are halogen, they are for example chlorine or fluorine. If $R_3$, $R_5$, $R_7$ and $R_{10}$ and the substituent of the amino group X are alkyl, then it can be methyl, ethyl, propyl, n-butyl or iso-butyl. If $R_3$, $R_7$ and $R_{10}$ are alkoxy groups they can be methoxy, ethoxy, propoxy or butoxy. If the amino group X is substituted by hydroxyalkyl it can be hydroxyethyl, hydroxypropyl or hydroxybutyl.

The new compounds have, moreover, a wide field of application. In particular, they are used for the brightening of textile materials, particularly synthetic textile material, of various kinds, such as wool, cotton and synthetic or semi-synthetic fibres, e.g. those made from polyesters such as polyterephthalic acid glycol esters, polyolefins such as polypropylene and polyethylene, polyamides such as nylon 6 and nylon 66, polyvinyl chloride and cellulose esters such as cellulose-2½-acetate and cellulose triacetate, and especially those made from polyacrylonitrile.

The organic material can be brightened, for example, by incorporating into it small amounts of optical brighteners according to the invention, preferably 0.001 to 1% relative to the material to be brightened, optionally together with other substances such as softeners, stabilisers or pigments. The brighteners may be worked into the synthetic materials, e.g. dissolved in softeners such as dioctylphthalate, or together with stabilisers such as dibutyl tin laurate or sodium pentaoctyltripolyphosphate, or together with pigments, e.g. titanium dioxide. Depending on the nature of the material to be brightened, the brightener can also be dissolved in the monomers before polymerisation, in the polymer mass, or together with the polymers in a solvent. The material preliminary treated in this manner is afterwards brought into the desired ultimate form by methods known per se, such as calendering, pressing, extrusion, coating, moulding and, in particular, spinning and stretching. It is also possible for the brighteners to be worked into finishings, e.g. into finishings for textile fibres such as polyvinyl alcohol, or into resins or resin pre-condensates such as, e.g. methylol compounds of ethylene urea, which are used for the treatment of textiles.

Preferably, however, colourless, high-molecular, organic material is brightened in the form of fibres. For the brightening of these fibre materials, an aqueous solution or dispersion of benzofurans of Formula I according to the invention is advantageously used. The brightener dispersion or solution preferably has, relative to the fibre material, a content of 0.005–0.5% of benzofuran according to the invention. In addition, the dispersion can contain auxiliaries such as dispersing agents, e.g. condensation products of fatty alcohols or alkylphenols containing 10 to 18 carbon atoms, with 15 to 25 moles of ethylene oxide, or condensation products of alkylmono- or polyamines containing 16 to 18 carbon atoms, with at least 10 moles of ethylene oxide, organic acids such as formic, oxalic or acetic acid, detergents, swelling agents such as di- or tri-chlorobenzenes, wetting agents such as sulphosuccinic acid alkyl esters, bleaching agents such as sodium chlorite, peroxides or hydrosulphites, as well as, optionally, brightening agents of other classes such as, e.g. derivatives of stilbene having affinity to cellulose.

The brightening of the fibre material with the aqueous brightener liquor is performed either by the exhaust process, at temperatures preferably of 30 to 150° C., or by the padding process. In the latter case, the material is impregnated, for example, with a 0.2–0.5% brightener dispersion, and is then finished, e.g. by a dry or moist heat treatment, e.g. by steaming at 2 atm. or, after drying is completed, by a short dry heating to 180 to 220°, whereby the fabric is optionally simultaneously thermofixed. The fibre material treated in this manner is finally rinsed and dried.

Colourless, high-molecular, organic material optically brightened according to the invention, particularly the natural or synthetic fibre material brightened by the exhaust process, has a pleasing, pure white, blue-violet to bluish fluorescent appearance; such material dyed in light shades and brightened according to the invention is distinguished by a pure shade. Benzofurans of Formula I can also be added to detergents; these can be used for the brightening of textiles. The detergents can contain the usual fillers and auxiliaries, e.g. alkali-poly- and -polymetaphosphates, alkali silicates, alkali borates, alkali salts of carboxymethyl celluloses, foam stabilisers such as alkanolamides of higher fatty acids, or complexones such as soluble salts of ethylenediaminetetraacetic acid, or diethylenetriaminepentaacetic acid, as well as chemical bleaching agents, such as perborates or percarbonates.

The new benzofurans are worked into the detergents or into washing liquors advantageously in the form of their solutions in water, or in neutral, water-miscible and/or readily volatile organic solvents such as lower alkanols, lower alkoxyalkanols or lower aliphatic ketones. They may, however, also be used in a finely dispersed form solid form, on their own or in admixture with dispersing agents. For example, they can be mixed, kneaded or milled with the wash-active substances; and then the usual auxiliaries and fillers added. The brightening agents are, for example, stirred together with the wash-active substances, the usual auxiliaries and fillers, and water, to form a slurry, and this is then sprayed in a spray drier. The new benzofuran derivatives may also be added to finished detergents, e.g. by spraying a solution in a readily volatile and/or water-soluble organic solvent on to the dry detergents as these are kept in motion.

The content in the detergents of optical brightener of Formula I is advantageously 0.001 to 5%, relative to the solid content in the detergent.

Washing liquors containing the benzofurans of Formula I impart, during washing, to the textile fibres treated therewith, e.g. cotton or synthetic polyamide, polyester, polyolefin and cellulose ester fibres, a brilliant appearance in daylight.

The compounds according to the invention can be produced by known methods from known starting materials.

Compounds of Formula I wherein $R_6$ represents the optionally substituted benzimidazolyl group, are produced, e.g. by starting with optionally substituted o-nitroaniline and acylating this with optionally substituted coumarilic acid, or with a functional derivative thereof; then reducing the nitro group in an acid medium, e.g. with stannous chloride; and simultaneously effecting ring closure to the imidazole ring.

The compounds can also, for instance, be produced from N-mono-substituted o-phenylenediamines, by acylating the latter with optionally substituted coumarilic acid or a functional derivative thereof and performing ring-closure in the correspondingly substituted primary acyl-o-phenylenediamine in the presence of acid condensation agents such as hydrochloric acid.

If, instead of o-nitroaniline, optionally substituted o-aminophenol is acylated, and the acylation product heated with the further splitting off of water, then compounds of Formula I are obtained, wherein $R_6$ represents a benzoxazolyl group.

Compounds of Formula I wherein $R_6$ represents the optionally substituted benzofuran - 2' - yl - oxdiazol-2-yl group can be produced by reacting optionally substituted benzofuran-2-carboxylic acid hydrazide with optionally substituted benzofuran-2-carboxylic acid chloride, and effecting in the obtained product, in the presence of acid condensation agents such as phosphorus oxychloride or thionyl chloride, ring closure.

Compounds of Formula I with the substituent $R_6$ representing a pyrazolin-3-yl group substituted in the 1-position by an optionally substituted phenyl group can be produced, e.g. by reacting a 2-($\omega$-aminopropionyl)-benzofuran di-substituted on the amino group with an optionally substituted phenyl hydrazine, in the presence of alkaline agents.

For the introduction of water-solubilising groups such as, e.g. $SO_3H$— groups, the benzofuran derivatives can be subsequently treated with sulphonating agents such as, e.g. $H_2SO_4$, mixtures of $H_2SO_4+SO_3$ or chlorosulphonic acid. Such sulphonic acids are particularly suitable for the brightening of cellulose substrates or polyamide from an acid bath.

The temperatures are given in degrees centigrade in the following examples.

EXAMPLE 1

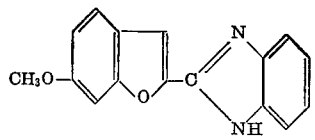

(1.1) 6-methoxy-2-[benzimidazolyl - (2)] - benzofuran: To a solution of 14.5 g. of o-nitroaniline in 200 ml. of pyridine are added at room temperature within 20–30 minutes, whilst stirring is maintained, 21.05 g. of 6-methoxycoumarilic acid chloride (B.P.$_8$: 171–173°). The mixture heats up thereby to ca. 40° and the acylation product precipitates already partly in crystalline form. After one hour of further stirring, the reaction mixture is heated, to complete the reaction, for a further one hour to 80–85°, and is then allowed to cool whilst stirring proceeds. From the reaction solution crystillises out 6-methoxycoumaric acid-o-nitroanilide, which is filtered off, washed with ethanol and dried, M.P. 172–173°.

31.2 g. of 6-methoxycoumarilic acid-o-nitroanilide are suspended in 1100 ml. of ethylene glycol monomethyl ether, and the suspension is heated to 80°. To the suspension is added dropwise at 80–90°, within 25 minutes, a solution of 107.0 g. of tin-II-chloride·2H$_2$O in 205 ml. of 37.3% hydrochloric acid. Accompanied by a slight rise in temperature, a clear, fluorescent solution is formed.

The solution is subsequently refluxed for 3 hours at 104–106° in a reflux condenser; it is allowed to cool to ca. 50° and is then poured into a mixture of 1250 ml. of 30% sodium hydroxide solution and 3400 ml. of water; the obtained solution is separated from the solvent by being intensively concentrated by evaporation in vacuo. The product hereby precipitating is filtered off under suction, washed with water until free of alkali, and dried. After crystallisation twice from water/ethanol (2:3), with the addition of decolourising carbon black, 6-methoxy-2-[benzimidazolyl-(2)]-benzofuran is obtained in the form of colourless shining crystals which contain ½ mol of crystal water and melt at 233–233.5°.

The new compound dissolves in ethanol with a blue-violet fluorescence in daylight, the fluorescence becoming appreciably more intense with the addition of inorganic or organic acids.

The compound is particularly suitable for the brightening of polyacrylonitrile fibres.

(1.2) If, instead of o-nitroaniline, the equivalent amount of 2-nitro-4-chloroaniline is used, the procedure being otherwise as described in the example, then 6-methoxy-2-([5-chlorobenzimidazolyl-(2)]-benzofuran is obtained which, after recrystallisation from benzene, is obtained in the form of colourless flakes which melt at 220–221.5°. This product possess properties similar to those of the above described compound.

(1.3) If, instead of o-nitroaniline, the equivalent amount of 4-methoxy-2-nitroaniline is used, the procedure being as described in the example, then 6-methoxy-2-[5-methoxybenzimidazolyl-(2)]-benzofuran is obtained. This product possesses properties similar to those of the above described compounds.

EXAMPLE 2

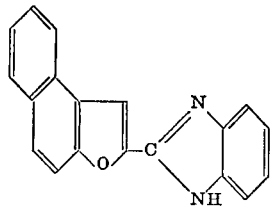

(2.1) 4,5-benzo-2-[benzimidazolyl-(2)]-benzofuran: To a solution of 14.5 g. of o-nitroaniline in 220 ml. of pyridine are added at room temperature within 30 minutes, whilst the solution is being stirred, 23.05 g. of finely powdered 4,5-benzocoumarone-2-carboxylic acid chloride. The mixture heats up thereby to ca. 40–45°, and the acylation product already partly crystallises out. After 30 minutes further stirring, the reaction mixture is heated for 1 hour to 90–95°, and the thin suspension is then poured on to a large amount of water. The obtained precipitate is filtered off under suction after 1–2 hours, washed with water and ethanol, and then dried. In this manner are obtained 29.4 g. of practically pure 4,5-benzocoumarone-2-carboxylic acid-o-nitroanilide, M.P. 229–230°. An analytical sample recrystallised from acetic acid melts at 231–231.5°.

26.2 g. of the above described acylation product are stirred together with 880 ml. of ethylene glycol monomethyl ether, and to this are added at 80–90° within 20 minutes 83.4 g. of tin-II-chloride·2H₂O dissolved in 163 ml. of 37.3% hydrochloric acid. The reaction mixture is subsequently stirred for 3 hours at 104–106°; it is then poured, after cooling, on to a mixture of 980 ml. of 30% sodium hydroxide solution and 2700 ml. of water; and, under reduced pressure, the ethylene glycol monomethyl ether is for the most part azeotropically distilled off with water, whereby the compound precipitates towards the end of distillation. After cooling, the pale-yellow-brown precipitate is filtered off with suction, washed with water and repeatedly recrystallised from aqueous ethanol. 4,5-benzo-2-[benzimidazolyl-(2)]-benzofuran is obtained in the form of practically colourless, spherical crystals containing ½ mol of crystal water and which sinter at ca. 145° and then melt at 231–232.5°.

The new compound dissolves in ethanol with a blue-violet fluorescence in daylight, the fluorescence becoming more intense with the addition of inorganic or organic acids.

The compound is particularly suitable for the brightening of polyacrylonitrile fibres.

The following benzofuran derivatives can be obtained in an analogous manner:

(2.2) From 5-chlorocoumarilic acid-o-nitroanilide, 5-chloro-2-[benzimidazolyl-(2)]-benzofuran, M.P. 254–256°.

(2.3) From 5-chlorocoumarilic acid-(4-chloro-2-nitro)-anilide, 5-chloro-2-[5-chlorobenzimidazolyl-(2)]-benzofuran, M.P. 186–188°.

(2.4) From 5,7-dichlorocoumarilic acid-o-nitroanilide, 5,7-dichloro-2-[benzimidazolyl-(2)]-benzofuran, M.P. 281–282°.

(2.5) From 5,7-dichlorocoumarilic acid-(4-chloro-2-nitro)-anilide, 5,7-dichloro-2-[5-chlorobenzimidazolyl-(2)]-benzofuran, M.P. 251–252°.

(2.6) From 6-methoxy-3-methylcoumarilic acid-o-nitroanilide, 6-methoxy-3-methyl-2-[benzimidazolyl-(2)]-benzofuran.

(2.7) From 6-methoxy-3-phenylcoumarilic acid-o-nitroanilide, 6-methoxy-3-phenyl-2-[benzimidazolyl-(2)]-benzofuran.

EXAMPLE 3

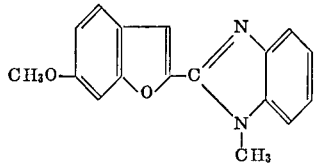

(3.1) 6-methoxy-2-[1-methylbenzimidazolyl-(2)]-benzofuran: To a solution of 7.6 g. of N-methyl-o-nitroaniline in 85 ml. of pyridine are added at room temperature, during the course of 10 minutes, 10.5 g. of 6-methoxy-coumarilic acid chloride. The reaction mixture is stirred for 3 hours at room temperature; it is heated for 1 hour to 80–85°, and then poured into water, whereby the acylation product firstly precipitates as oil which crystallises after a short time. After drying and recrystallisation once from benzene/petroleum ether, 6-methoxy-coumarilic acid-N-methyl-o-nitroanilide is obtained in the form of practically colourless, cube-shaped crystals which melt at 105.5–106.5°.

13.0 g. of the above described acylation product are stirred together with 400 ml. of ethylene glycol monomethyl ether, and to the mixture are added at 80–90° within 15 minutes 42.0 g. of tin-II-chloride·2H₂O dissolved in 84 ml. of 37.3% hydrochloric acid. The reaction mixture is subsequently stirred for 3 hours at 104–106°; it is then poured, after cooling, into 1800 ml. of 10% sodium hydroxide solution; and from the obtained solution, under reduced pressure, ethylene glycol monomethyl ether is azeotropically distilled off with water, whereby the compound precipitates towards the end of distillation. After cooling, the product is separated, washed with water, and dried. By means of repeated recrystallisation from chloroform/petroleum ether (1:2) is obtained 6-methoxy-2-[1-methylbenzimidazolyl-(2)]-benzofuran in the form of practically colourless crystals which melt at 151–151.5°.

The new compound dissolves in ethanol with a blue-violet fluorescence in daylight, the fluorescence becoming appreciably more intense with the addition of inorganic or organic acids.

The compound is particularly suitable for the brightening of polyacrylonitrile fibres.

The same compound is also obtained by methylating the benzimidazole obtainable according to Example 1 in methanolic solution in the presence of alkali hydroxide with dimethyl sulphate or methyl iodide.

(3.2) If, instead of 6-methoxycoumarilic acid chloride, the equivalent amount of 4,5-benzocoumarone-2-carboxylic acid chloride is used, with the procedure otherwise as described in the example, then 4,5-benzo-2-[1-methylbenzimidazolyl-(2)]-benzofuran is obtained which, after recrystallisation from ethanol, is in the form of colourless crystals which melt at 208–209°. This product possesses properties similar to those of the above described compound, and is therefore particularly suitable for the brightening of polyacrylonitrile fibres.

EXAMPLE 4

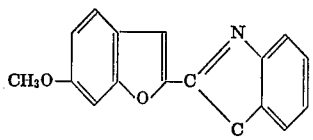

(4.1) 6-methoxy - 2 - [benzoxazolyl-(2)]-benzofuran: 24.0 g. of 6-methoxycoumarilic acid and 13.6 g. of o-aminophenol are refluxed in 450 ml. of xylene in the presence of 0.5 g. of boric acid for 26 hours in a reflux condenser, whilst stirring is maintained; the formed water being continuously separated by means of a water-separator. After cooling, the acylamino compound is filtered off and washed with ethanol. After crystallisation from ethanol, with the addition of decolourising carbon black, 22.6 g. of practically colourless, feather-like crystals of 6-methoxycoumarilic acid-o-hydroxyanilide are obtained, which melt at 229–229.5°.

6.0 g. of finely powdered acylamino compound are intimately mixed with 18.0 g. of anhydrous zinc chloride, and heated, with the exclusion of moisture, during 20–30 minutes in an oil-bath at 200–205°. A dark green melt is hereby formed which, after cooling, completely solidifies. The melt is pulverised and then stirred with 200 ml. of water for 1½ hours at 50–60°; and the pH-value is adjusted to 3–5 by the addition of hydrochloric acid. The product is thereupon filtered under suction, washed with water, and dried. After recrystallisation three times from ethanol, 6-methoxy-2-[benzoxazolyl-(2)]-benzofuran is obtained in the form of slightly flesh-coloured crystals which melt at 144.5–145°, and which have a pale violet fluorescence in ultraviolet light.

The compound possesses good affinity to polyacrylonitrile fibres, and is therefore suitable for the brightening of these fibres.

The following benzofuran derivatives can be produced in an analogous manner:

(4.2) From 6-methoxycoumarilic acid and m-amino-p-cresol, 6-methoxy-2-[5-methylbenzoxazolyl-(2)]-benzofuran, M.P. 128–128.5°.

(4.3) From 4,5-benzocoumarone-2-carboxylic acid and o-aminophenol, 4,5-benzo-2-[benzooxazolyl-(2)]-benzofuran, M.P. 172.5–173°.

(4.4) From 4,5-benzocoumarone-2-carboxylic acid and m-amino-p-cresol, 4,5-benzo-2-[5-methylbenzoxazolyl-(2)]-benzofuran, M.P. 194.5–195°.

EXAMPLE 5

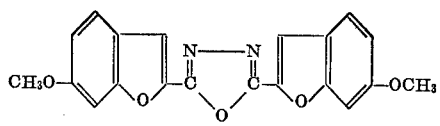

(5.1) 2,5 - bis - [6 - methoxybenzofuranyl-(2)]-1,3,4-oxadiazole: 12.3 g. of 6-methoxybenzofuran -2-carboxylic acid hydrazide (produced in the usual manner from the ester and hydrazine hydrate in ethanol, M.P. 127.5–128°) are dissolved, with stirring, in 150 ml. of pyridine at room temperature. 12.6 g. of 6-methoxybenzofuran-2-carboxylic acid chloride are then added, which rapidly dissolve with a slight rise in temperature. Stirring afterwards proceeds for 2 hours, the reaction mixture is heated for ¾ of an hour to 80–85°, and is then poured into water, whereby the reaction product precipitates in crystalline form. After separation and washing with water, the product is dried in vacuo. In this manner are obtained 22.6 g. of crude bis-(6-methoxybenzofuran-2-carboxy) - hydrazide. After recrystallisation from acetic ester, colourless crystals are obtained which melt at 208–209°.

20.0 g. of crude bis-(6-methoxybenzofuran-2-carboxy)-hydrazide are introduced at room temperature, whilst stirring is maintained, into 80 ml. of phosphorous oxychloride. The suspension is heated to 85–90° and stirred for 4 hours at this temperature, whereby a light-brown, clear solution is gradually formed. The somewhat cooled reaction mixture is thereupon poured, with stirring, onto ice/water and, after completed decomposition of excess phosphorus oxychloride, the precipitated product is filtered under suction, washed with water until the reaction obtained is neutral, and dried. After crystallization twice from acetic ester, with the addition of decolourising carbon black, 13.9 g. of 2,5-bis-[6-methoxybenzofuranyl-(2)]-1,3,4-oxadiazole are obtained in the form of flat crystal-platelets which melt at 225–225.5°.

A solution of the new 1,3,4-oxadiazole in acetic acid is colourless and exhibits in daylight an intense blue-violet fluorescence.

The compound possesses good affinity to polyamide and polyester fibers, and is therefore particularly suitable for the brightening of these substrates.

In an analogous manner, it is possible to produce from (5.2) bis - (4,5-benzocoumarone-2-carboxy)-hydrazide, 2,5-bis[4,5-benzocoumaronyl-(2)] - 1,3,4 - oxadiazole M.P. 271–271.5°.

EXAMPLE 6

(6.1)

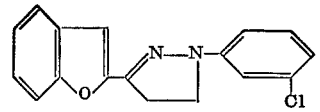

A suspension of 12.7 g. of ω-dimethylamino-2-propionylbenzofuran hydrochloride, 9.3 g. of 3-chlorophenyl-hydrazine, 16 g. of sodium carbonate, 100 ml. of ethanol and 70 ml. of water is refluxed for 8 hours. The reaction mixture is thereupon cooled, filtered under suction, washed with water and dried. After recrystallization twice from a mixture of benzene and hexane are obtained, with the aid of bleaching earth, 10 g. (corresponding to 67.5% of the theoretical value) of 1-(3'-chlorophenyl)-3-(benzofur-2'-yl)-pyrazoline, M.P. 118–119° (uncorrected), absorption $\lambda_{max.}$ 374 nm. If, instead of ω-dimethylamino-2-propionylbenzofuran hydrochloride, ω-dimethylamino-2-propionyl-5-chlorobenzofuran hydrochloride is used, with the procedure otherwise as described above, then a compound of the formula:

(6.2)

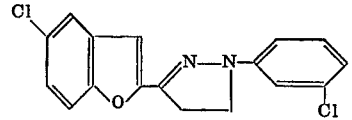

is obtained, M.P. 129–131° (uncorrected), absorption $\lambda_{max.}$ 380 nm.

The ω-dimethylamino-2-propionylbenzofuran hydrochloride used as starting material can be produced as follows:

A mixture of 16 g. of 2-acetylbenzofuran, 12.2 g. of dimethylamine hydrochloride, 3.6 g. of paraformaldehyde, 30 ml. of ethanol and 0.3 ml. of concentrated hydrochloric acid is refluxed for 5 hours. The mixture is then cooled to room temperature, the obtained crystalline precipitate filtered under suction, washed wtih cold ethanol, and dried. In this manner are obtained 17.8 g. (corresponding to 70.5% of the theoretical value) of ω-dimethylamino-2-propionylbenzofuran hydrochloride, M.P. 201–203°.

If, instead of 2-acetylbenzofuran, 2-acetyl-5-chlorobenzofuran is used, with otherwise the same procdure as described above, then ω-dimethylamino-2-propionyl-5-chlorobenzofuran hydrochloride, M.P. 173–175°, is obtained.

EXAMPLE 7

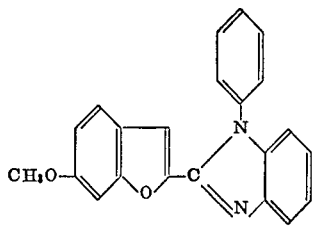

(7.1) 6 - methoxy - 2 - [1 - phenyl - benzimidazolyl-(2)]-benzofuran: 21.7 g. of 6-methoxycoumarilic acid chloride are quickly added with stirring at room temperature to a solution of 18.4 g. of 2-amino-diphenylamine in 200 ml. of pyridine. The temperature of the reaction mixture rises to about 45°. After 15 minutes the reaction mixture is heated for another hour at 80–85° to complete the reaction. The dark solution is then poured into a generous amount of water. The precipitated brown rose colored acylation product which is at first slimy, solidifies after several hours and is then separated by suction filtration, washed with water and dried. After recrystallization from ethanol, 31.5 g. (88% of theory) of 2-[6-methoxycoumaroylamido]-diphenylamine are obtained. M.P. 141–142°.

17.9 g. of 2-[6-methoxycoumaroylamido]-diphenylamine are stirred in 180 ml. of ethylene glycol monomethyl ether, treated with 15.0 g. of 37.3% hydrochloric acid, and the reaction mixture is heated to 100–105° and gently refluxed for 4 hours at this temperature. The strongly fluorescing reaction solution is then poured into a mixture of 18 ml. of 30% sodium hydroxide solution and 1800 ml. of water, thus precipitating the reaction product which is somewhat slimy at first. After standing for several hours, the solidified product is separated, pulverized, washed with water until free of alkaline and dried. 14.6 g. (85.8% of theory) of dark brown red crystals having a melting point of 151–155° are obtained. By recrystallizing from toluene, and treating with decolorizing carbon and bleaching earth, the compound of the above formula is obtained as almost colorless crystals having a melting point of 161–162°.

The compound dissolves in dioxane with blue violet fluorescence in daylight, which is substantially intensified by the addition of inorganic or organic acids.

The compound is excellently suited for the optical brightening of polyacrylonitrile fibers.

If the 2-amino-diphenylamine is replaced by the equivalent amount of N-cyclohexyl-1,2-phenylenediamine or N-benzyl-1,2-phenylenediamine and otherwise the procedure described in the example is followed, (7.2) 6 - methoxy - 2 - 1 - cyclohexyl - benzimidazolyl-(2)-benzofuran, or (7.3) 6 - methoxy - 2 - 1 - benzyl - benzimidazolyl - (2)-benzofuran, having similar properties is obtained.

EXAMPLE 8

To 100 ml. of water are added 0.12 ml. of 85% formic acid and 0.6 g. of alkylpolyglycol ether. A solution is prepared of the optical brightener according to Example 1.1 by dissolving 1 g. thereof in 1000 ml. of ethylene glycol monomethyl ether. 1.5 ml. of this stock solution are added to the above described solution. The thus obtained liquor is heated to 60°, and 3 g. of polyacrylonitrile fabric are introduced. The temperature is raised within 10–15 minutes to 95–98° and this temperature is maintained for 1 hour. The fabric is then rinsed for 2 minutes in running water, and subsequently dried for 20 minutes at 60°. The thus treated fabric has a white, brilliant appearance.

By proceeding as described in the above example but using, instead of the brightener given there, the compounds described in the Examples 1.2, 2, 3, 4 and 7, whereby only 0.75 ml. of the brightener stock solution of the compounds of Example 4 are used, similar results are obtained.

EXAMPLE 9

To 100 ml. of water are added 0.2 g. of sodium nitrate, 0.2 g. of 80% sodium chlorite, 0.2 g. of oxalic acid or an equivalent amount of another organic or inorganic acid suitable for this purpose, as well as 0.06 g. of alkylpolyglycol ether. A solution is prepared of the brightener according to Example 3.1 by dissolving 1 g. of the stated brightener in 1000 ml. of ethylene glycol monomethyl ether. 1.5 ml. of this stock solution are added to the above described solution. This liquor is heated to 60°; 3 g. of polyacrylonitrile fabric are then added, the temperature is raised within 10–15 minutes to 95–98°, and the bath is allowed to stand for 60 minutes at this temperature. The fabric is then rinsed in cold water and dried for 20 minutes at 60°. The thus treated fabric has a white, brilliant appearance.

Similar results are obtained with the procedure as described above but using the brighteners given in Example 1, 2.1, 3.2 or 7.1.

EXAMPLE 10

To 100 ml. of water are added 0.2 g. of sodium sulphate and 0.06 g. of alkylpolyglycol ether. A solution is prepared of the optical brightener according to Example 4.1 by dissolving 1 g. thereof in 1000 ml. of ethylene glycol monomethyl ether. An amount of 2 ml. of this stock solution is added to the above described solution, and the obtained liquor is heated to 40–45°. 3 g. of pre-bleached cotton fabric are then introduced into the solution, and the material is treated at this temperature for 30 minutes. The fabric is afterwards rinsed for 2 minutes in running water, and subsequently dried for 20 minutes at 60°. The thus treated fabric has a pleasing white appearance.

Similar results are obtained by using, with otherwise the same procedure as described above, the brighteners given in Example 1, 2, 3, 4.2, 4.3, 4.4, 5, or 7.

EXAMPLE 11

To 100 ml. of water are added 0.4 g. of detergent of the following composition:

|  | Percent |
|---|---|
| Dodecylbenzene sulphonate | 16 |
| Fatty alcohol sulphonate | 4 |
| Na-tripolyphosphate | 35 |
| Tetrasodium pyrophosphate | 7 |
| Magnesium silicate | 2 |
| Sodium disilicate | 7 |
| Carboxymethyl cellulose | 1 |
| Ethylenediaminotetraacetic acid sodium salt | 0.5 |
| Sodium sulphate [1] | 25 |
| Water | 2.5 |

[1] Instead of sodium sulphate, the detergent can also contain 10–20% of sodium perborate or some other oxygen-releasing agent.

1 g. of the optical brightener obtainable according to Example 4.3 is dissolved in 1000 ml. of ethylene glycol monomethyl ether. An amount of 2 ml. of this stock solution is added to the above described aqueous solution. The thus obtained washing liquor is heated to 60°, and 3 g. of a pre-bleached cotton fabric are introduced into the liquor. The temperature is raised within 10–15 minutes to 92° and the bath is allowed to stand for 30 minutes at this temperature. The fabric is subsequently rinsed and dried. The fabric treated in this manner has a white and brilliant appearance.

Similar results are obtained by proceeding as described above but using, instead of the above brightener, the brightener described in Example 1, 2, 3, 4.1, 4.2, 4.4, 5, or 7.

EXAMPLE 12

To 100 ml. of water are added 0.2 g. of trichlorobenzene as carrier, and to this is added a solution of 0.0015 g. of the oxadiazole described in Example 5.1, in 1.5 ml. of dimethylformamide. The thus obtained liquor is heated to 60°, and 3 g. of a polyester fabric are introduced into the liquor. The temperature is raised within 10–15 minutes to 95–98° and the liquor is allowed to stand at this temperature for 1 hour. The fabric is then rinsed for 2 minutes in running water, and is subsequently dried for 20 minutes at 60°. The fabric treated in this manner has a white, brilliant appearance.

A similar result is obtained by using the brightener according to Example 5.2.

In this example and in the following Examples 13 and 15, the expression "trichlorobenzene as carrier" signifies a mixture consisting of 76 parts of 1,2,4-trichlorobenzene and
27 parts of a mixture of suitable emulsifiers.

EXAMPLE 13

To 290 ml. of water are added 0.15 ml. of trichlorobenzene as carrier, and 0.3 ml. of alkylpolyglycol ether. A solution is prepared of the optical brightener according to Example 5.2 by dissolving 1 g. of the said optical brightener in 1000 ml. of dimethylformamide. An amount of 7.5 ml. of this stock solution is added to the above described solution. The aqueous dispersion containing the optical brightener is heated to 60°; and 15 g. of polyester fabric are introduced into the solution. The temperature is raised within 15–20 minutes to 130° and the fabric is left at this temperature for 30 minutes, whereupon the temperature is lowered within 10–15 minutes to 60°. The fabric is then rinsed for 2 minutes in running water, and subsequently dried for 20 minutes at 60°. The thus treated fabric has a white and brilliant appearance.

A similar result is obtained by using, with otherwise the same procedure as described above, the brightener according to Example 5.1.

EXAMPLE 14

A solution is produced of the optical brightener according to Example 5.1 by dissolving 1 g. thereof in 1000 ml. of dimethylformamide. A polyester fabric is padded at 20° with this solution (squeezing effect 50–60%, roller-pressure 30 kg./cm.$^2$, speed: 3 m./minute). The fabric is dried for 20 minutes at 60° and afterwards fixed for 30 seconds at 200°. The thus treated fabric has a white, brilliant appearance.

A similar result is obtained by using, with otherwise the same procedure as described above, the brightener according to Example 5.2.

EXAMPLE 15

To 290 ml. of water are added 0.3 ml. of alkylpolyglycol ether and 0.15 ml. of trichlorobenzene as carrier. A stock solution is prepared of the optical brightener according to Example 5.2 by dissolving 1 g. of the said optical brightener in 1000 ml. of dimethylformamide. 4.5 ml. of this stock solution are added to the above described solution. This aqueous dispersion containing the brightener is heated to 60°; 15 g. of polyester fabric are then introduced into this liquor, and the temperature is raised within 15–20 minutes to 130°. The fabric is left at this temperature for 30 minutes, whereupon the temperature is lowered within 10–15 minutes to 60°. The fabric is then rinsed for 2 minutes in cold running water, and afterwards dried for 20 minutes at 60°. The dry fabric is subsequently thermofixed for 30 seconds at 200°. After this treatment, the fabric has a white, brilliant appearance.

A similar result is obtained by using the brightener according to Example 5.1, with the procedure otherwise as described above.

EXAMPLE 16

To 100 ml. of water are added 0.4 g. of detergent as given in Example 10. A solution is prepared of the optical brightener according to Example 5.1 by dissolving 1 g. thereof in 1000 ml. of dimethylformamide. An amount of 0.8 ml. of this stock solution is added to the above described washing liquor, and this is heated to 60°. Into this liquor are then introduced 3 g. of polyester fabric, and this is treated for 30 minutes at this temperature. The fabric is then rinsed as usual, and dried. The thus treated fabric is clearly brightened.

A similar result is obtained by using the brightener according to Example 5.2, with the procedure otherwise as described above.

EXAMPLE 17

To 100 ml. of water are added 0.06 g. of alkylpolyglycol ether. A solution is prepared of the optical brightener according to Example 4.3 by dissolving 1 g. thereof in 1000 ml. of ethylene glycol monomethyl ether. An amount of 3 ml. of this stock solution is added to the above described solution. This aqueous liquor containing the brightener is heated to 60°, and 3 g. of nylon fabric are introduced into the liquor. The temperature is raised within 10–15 minutes to 92–95°, and the fabric is left at this temperature for 30 minutes. After rinsing and drying, the thus treated material has a white and brilliant appearance.

Similar results are obtained with the brighteners according to Example 5.

EXAMPLE 18

To 100 ml. of water are added 0.12 ml. of 85% formic acid and 0.06 g. of alkyl polyglycol ether. A solution is prepared of the optical brightener according to Example 4.3 by dissolving 1 g. thereof in 1000 ml. of ethylene glycol monomethyl ether. 3 ml. of this stock solution are added to the above described aqueous solution. The aqueous liquor containing the brightener is heated to 60°; 3 g. of nylon fabric are then introduced, and the temperature is raised within 10–15 minutes to 92–95°, whereupon the liquor is left for 30 minutes at this temperature. The fabric is then rinsed and dried. The thus treated fabric has a white and brilliant appearance.

Similar results are obtained with the brighteners described in Examples 4.4 and 5, using the same method of application, whereby dimethylformamide is used as solvent for the solution of the brightener given in Example 5.

EXAMPLE 19

To 100 ml. of water are added 0.4 g. of detergent as given in Example 10. A solution is prepared of the optical brightener according to Example 5.1 by dissolving 1 g. thereof in 1000 ml. of dimethylformamide. 2 ml. of this stock solution are added to the above described washing liquor; this is heated to 60°, and 3 g. of nylon fabric are introduced into the solution. The material is treated at this temperature for 30 minutes. After rinsing and drying, the fabric has a brilliant, white appearance.

Similar results are obtained with the brighteners described in Examples 4.2, 4.3 and 5.2, using otherwise the same procedure.

EXAMPLE 20

To 95 ml. of water are added 0.06 ml. of 40% acetic acid and 0.06 ml. of alkylpolyglycol ether. A solution is prepared of the optical brightener according to Example 5.1 by dissolving 1 g. thereof in 1000 ml. of dimethylformamide. An amount of 6 ml. of this stock solution is added to the above described solution. The aqueous liquor is left for 30 minutes at this temperature. The g. of triacetate fabric are introduced. The temperature is raised within 10–15 minutes to 95–98° and the liquor is left at this temperature for 30 minutes. The fabric is then rinsed and dried. The thus treated fabric has a white, brilliant appearance.

EXAMPLE 21

To 95 ml. of water are added 0.06 ml. of 40% acetic acid and 0.06 ml. of alkylpolyglycol ether. A solution is prepared of the optical brightener according to Example 5.1 by dissolving 1 g. of the said brightener in 1000 ml. of dimethylformamide. An amount of 6 ml. of this stock solution is added to the above described solution. The obtained liquor is heated to 40° and 3 g. of acetate fabric are introduced. The temperature is raised within 10–15 minutes to 75–80°, and the liquor is left at this temperature for 30 minutes. The fabric is then rinsed with cold water, and dried. The thus treated fabric has a white, brilliant appearance.

Similar results are obtained with the brighteners according to Examples 4.2, 4.3, 4.4 and 5.2.

EXAMPLE 22

To 100 ml. of water are added 0.6 ml. of 4% acetic acid and 0.06 g. of an alkylpolyglycol ether. A solution is prepared of the optical brightener described in Example 6.1 by dissolving 1 g. of the said brightener in 1000 ml. of dimethylformamide. 6 ml. of this stock solution are added to the above described aqueous solution. This aqueous solution containing the brightener is heated to 40°; then 3 g. of fabric made from isotactic polypropylene ("Meraklon") are introduced into the solution. The temperature is raised within 10–15 minutes to 95–98° and the bath is kept at this temperature for 30 minutes. The fabric is rinsed and dried.

The thus treated fabric has a white, brilliant appearance.

Similar effects are obtained by using, with otherwise the same procedure, instead of the stated brightener, identical amounts of the compound of Example 6.2.

EXAMPLE 23

100 parts of polypropylene with 0.5 part of titanium dioxide and 0.05 part of the optical brightener described in Example 6.1 are homogenised at 200° in a kneading machine. Under an inert gas at 2–3 atm. and at a temperature of 280–300°, the melt is spun, by known methods, through spinning nozzles. The thus obtained polypropylene threads are distinguished by a high degree of whiteness.

Similar effects are obtained by using, with otherwise the same procedure, instead of the above stated brightener, identical amounts of the brightener according to Example 6.2.

What we claim is:
1. A benzofuran of Formula I,

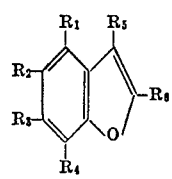

(I)

wherein
$R_1$ represents hydrogen or together with $R_2$ and the 2 carbon atoms to which $R_1$ and $R_2$ are attached, it represents benzene, $R_2$ represents hydrogen, halogen, or together with $R_1$ and the 2 carbon atoms to which $R_1$ and $R_2$ are attached, it represents benzene, $R_3$ represents hydrogen or alkoxy of 1 to 4 carbon atoms, $R_4$ represents hydrogen or halogen, $R_5$ represents hydrogen, alkyl of 1 to 4 carbon atoms, or phenyl, $R_6$ stands for the following:

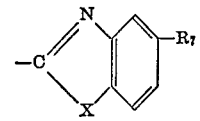

wherein
X represents NR—,
wherein R stands for hydrogen, alkyl of 1 to 4 carbon atoms, hydroxyalkyl of 1 to 4 carbon atoms, phenyl, benzyl or cyclohexyl, and $R_7$ represents hydrogen, alkyl of 1 to 4 carbon atoms, alkoxy comprising of 1 to 4 carbon atoms, or halogen, and wherein at least one of $R_1$, $R_2$, $R_3$, and $R_4$ is a substituent other than hydrogen.

2. A compound according to claim 1 wherein
$R_2$ represents hydrogen, chlorine or together with $R_1$ and the 2 carbon atoms to which $R_1$ and $R_2$ are attached, it represents benzene $R_3$ represents hydrogen or methoxy, $R_4$ represents hydrogen or chlorine, $R_5$ represents hydrogen, methyl or phenyl, X represents NR—, wherein R stands for hydrogen, methyl, cyclohexyl, phenyl or benzyl, and $R_7$ represents hydrogen, chlorine or methyl.

3. A compound according to claim 1 which is

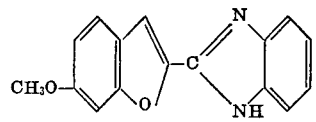

4. A compound according to claim 1 which is

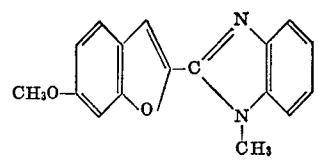

5. A compound according to claim 1 which is

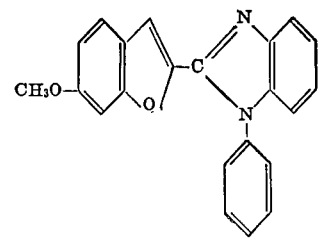

6. A compound according to claim 1 which is
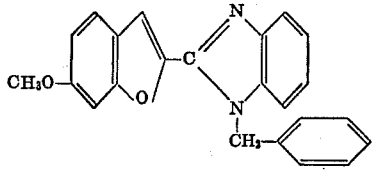
References Cited
UNITED STATES PATENTS
| 3,103,518 | 9/1963 | Duennenberger et al. | |
| | | | 260—309.2 |
| 3,497,525 | 2/1970 | Harnisch et al. | 260—309.2 |
FOREIGN PATENTS
| 1,580,823 | 8/1969 | France | 260—309.2 |
| 1,117,000 | 11/1969 | Germany | 260—309.2 |
| 1,200,907 | 8/1970 | Great Britain | 260—309.2 |
NATALIE TROUSOF, Primary Examiner
U.S. Cl. X.R.
252—8.8, 301.2 W, 301.3 W; 260—307 D, 307 G, 310 D, 346.2 R

UNITED STATES PATENT OFFICE
CERTIFICATE OF CORRECTION

Patent No. 3,772,323                    Dated November 13, 1973

Inventor(s) HANS SCHLAPFER ET AL

It is certified that error appears in the above-identified patent and that said Letters Patent are hereby corrected as shown below:

Column 1, between line 7 (beginning "No Drawing ...") and line 8 (beginning "Int. Cl. ..."), insert -- Claims priority, application Switzerland, June 27, 1969, 9,863/69 --.

Signed and sealed this 5th day of November 1974.

(SEAL)
Attest:

McCOY M. GIBSON JR.
Attesting Officer

C. MARSHALL DANN
Commissioner of Patents